United States Patent
Yasuda et al.

(10) Patent No.: US 10,762,419 B2
(45) Date of Patent: *Sep. 1, 2020

(54) DIGITIAL STDP SYNAPSE AND LIF NEURON-BASED NEUROMORPHIC SYSTEM

(71) Applicant: INTERNATIONAL BUSINESS MACHINES CORPORATION, Armonk, NY (US)

(72) Inventors: Takeo Yasuda, Nara-ken (JP); Kohji Hosokawa, Shiga-ken (JP); Yutaka Nakamura, Kyoto (JP); Junka Okazawa, Kyoto (JP); Masatoshi Ishii, Shiga-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/526,127

(22) Filed: Jul. 30, 2019

(65) Prior Publication Data
US 2019/0354845 A1 Nov. 21, 2019

Related U.S. Application Data

(63) Continuation of application No. 14/980,505, filed on Dec. 28, 2015, now Pat. No. 10,552,731.

(51) Int. Cl.
*G06N 3/063* (2006.01)
*G06N 3/04* (2006.01)

(52) U.S. Cl.
CPC .............. *G06N 3/063* (2013.01); *G06N 3/049* (2013.01)

(58) Field of Classification Search
CPC .............................. G06N 3/049; G06N 3/063
See application file for complete search history.

(56) References Cited

U.S. PATENT DOCUMENTS

| | | |
|---|---|---|
| 5,278,945 A | 1/1994 | Basehore et al. |
| 5,333,239 A | 7/1994 | Watanabe et al. |
| 8,943,008 B2 | 1/2015 | Ponulak et al. |
| 9,349,092 B2 | 5/2016 | Thibeault et al. |
| 9,984,326 B1 | 5/2018 | Chen et al. |
| 2012/0084241 A1 | 4/2012 | Friedman et al. |
| 2014/0032465 A1 | 1/2014 | Modha et al. |
| 2014/0180985 A1 | 6/2014 | Alvarez-Icaza Rivera et al. |
| 2015/0046382 A1 | 2/2015 | Rangan et al. |

(Continued)

OTHER PUBLICATIONS

Jin et al., Implementing Spike-Timing-Dependent Plasticity on SpiNNaker Neuromorphic Hardware, Oct. 14, 2010, IEEE, pp. 1-8 (Year: 2010).*

(Continued)

*Primary Examiner* — Robert A Cassity
*Assistant Examiner* — Brent Johnston Hoover
(74) *Attorney, Agent, or Firm* — Tutunjian & Bitetto, P.C.; Vazken Alexanian

(57) ABSTRACT

Described is a neuromorphic system implemented in hardware that implements neuron membrane potential update based on the leaky integrate and fire (LIF) model. The system further models synapse weights update based on the spike time-dependent plasticity (STDP) model. The system includes an artificial neural network in which the update scheme of neuron membrane potential and synapse weight are effectively defined and implemented.

19 Claims, 11 Drawing Sheets

(56) References Cited

U.S. PATENT DOCUMENTS

2015/0106316 A1    4/2015    Birdwell et al.
2015/0278685 A1    10/2015    Zheng et al.
2016/0086075 A1    3/2016    Alvarez-Icaza Rivera et al.

OTHER PUBLICATIONS

Kim et al., "A digital neuromorphic VLSI architecture with memristor crossbar synaptic array for machine learning", Sep. 12-14, 2012, 2012 IEEE International SOC Conference, pp. 328-333 (Year: 2012).*

Wang, "A Neuromorphic Implementation of Multiple Spike-timing Synaptic Plasticity Rules for Large-Scale Neural Networks", Frontiers in Neuroscience, May 2015, 17 pages.

U.S. Office Action issued in U.S. Appl. No. 15/168,959 dated Nov. 14, 2019.

List of IBM Patents or Patent Applications Treated as Related dated Jul. 30, 2019, 2 pages.

Sangsu Park et al., "Electronic system with memristive synapses for pattern recognition", Scientific Reports, www.nature.com/scientifcreports, May 2015.

U.S. Office Action issued in U.S. Appl. No. 14/980,554 dated Aug. 20, 2019 (24 pages).

Pfeil, T. et al., "Is a 4-bit synaptic weight resolution enough?—constraints on enabling spike-timing dependent plasticity in neuromorphic hardware" Frontiers in Neuroscience (Jul. 2012) pp. 1-19, vol. 6, article 90.

Schmiedt, T. et al., "Spike timing-dependent plasticity as dynamic filter" Advances in Neural Information Processing Systems (Jan. 2010) pp. 1-9.

U.S. Office Action issued in U.S. Appl. No. 14/980,554, dated Jan. 2, 2018, pp. 1-30.

U.S. Office Action issued in U.S. Appl. No. 15/168,959, dated Jan. 24, 2019, pp. 1-16.

Frank, "An Accelerator for Neural Networks with Pulse-Coded Model Neurons", IEEE Transactions on Neural Networks, vol. 10, No. 3, May 1999, pp. 527-538.

Merolla, "A Digital Neuro-Synaptic Core Using Embedded Crossbar Memory with 45pJ per Spike in 45nm", IEEE Custom Integrated Circuit Conference, Sep. 2011, 4 pages.

U.S. Office Action issued in U.S. Appl. No. 15/168,959 dated May 29, 2019, 13 pages.

U.S. Office Action issued in U.S. Appl. No. 14/980,295 dated May 31, 2019, 20 pages.

U.S. Office Action issued in U.S. Appl. No. 15/168,959 dated Apr. 13, 2020 (19 pages).

* cited by examiner

# DIGITIAL STDP SYNAPSE AND LIF NEURON-BASED NEUROMORPHIC SYSTEM

BACKGROUND

Technical Field

The present invention relates to neuromorphic systems and more particularly to neuromorphic systems that account for spike time dependent plasticity (STDP) synapse and leaky integrate and fire (LIF) models of neuron activity.

Description of Related Art

Neuromorphic systems with spike time dependent plasticity (STDP) synapse and leaky integrate and fire (LIF) neuron models may be simulated in software by describing the system in a mathematical model. However, the computing operation can take a long time in a software model, even when only a few synapses and neurons are modeled, for example, in a recognition of hand-written numbers.

SUMMARY

According to present principles, described is a neuromorphic system implemented in hardware that models neuron membrane potential based on leaky integrate and fire (LIF) model. The system also models the spike time-dependent plasticity rule (STDP) approach to assessing synapse weight values. The hardware implementation of the system measures neuron activity and synapse activity between the axons of pre-neurons and neuron bodies of post-neurons. The system also includes timers for measuring the time elapsed time between axon spikes and dendrite spikes. A neuron membrane potential register stores current neuron membrane potential values of neurons in the network. The system includes a neuron membrane potential updating logic that determines updated neuron membrane potential values based on the leaky integrate and fire model of neuron membrane potential behavior.

Synapse weights of the synapses are stored, for example, in a memory unit, e.g., a RAM unit, and synapse weight values of the synapses are updated with a logic that is based on spike time-dependent plasticity rule.

Internal determinations in the system are processed serially. The system includes a serial to parallel converter that converts serial neuron fire data streams to parallel neuron fire data streams.

In accordance with present principles, also described is a hardware-implemented method for simulating neuron activity with leaky integrate and fire modeling and spike time-dependent plasticity modeling. According to the method, neuron activity and synapse activity between the axons of pre-neurons and neuron bodies of post-neurons are generated in a wired network. The elapsed times between occurrences of axon spikes in synapses between neurons and the occurrences of dendrite spikes in synapses between neurons are measured by timer units. The current neuron membrane potentials of neurons are stored in a neuron membrane potential register and used in updating neuron membrane potential values in a block that performs the update based on the leaky integrate and fire model of neuron membrane potential. Further, current values of synapse weights are stored in a computer memory block and are used to update synapse weight values of the synapses in a logic block that performs the update determination based on the spike time-dependent plasticity rule. Neuron fire data is converted from serial neuron fire data to parallel neuron fire data, and may be used as the axon spikes of the post-neuron in connected synapses.

These and other features and advantages will become apparent from the following detailed description of illustrative embodiments thereof, which is to be read in connection with the accompanying drawings.

BRIEF DESCRIPTION OF THE DRAWINGS

The disclosure will provide details in the following description of preferred embodiments with reference to the following figures wherein.

DETAILED DESCRIPTION

In accordance with present principles, the described digital neuromorphic system mimics behaviors of biological nerve cells through the accounting for STDP synapse behavior and LIF neuron activity. The aspects are implemented in system hardware to provide a system that can engage in on-system learning.

With STDP, repeated presynaptic spike arrival a few milliseconds before postsynaptic action potentials leads in many synapse types to long-term potentiation (LTP) of the synapses, whereas repeated spike arrival after postsynaptic spikes leads to long-term depression (LTD) of the same synapse. The change of the synapse plotted as a function of the relative timing of pre- and postsynaptic action potentials is called the STDP function or learning window and varies between synapse types. The rapid change of the STDP function with the relative timing of spikes suggests the possibility of temporal coding schemes on a millisecond time scale.

In the neuromorphic system according to present principles, each of the synapses of the network, which again are located between the axons of pre-neurons and the dendrites of post-neurons, has its own synapse weight that is indicative of the strength of the connection between the axon and dendrite. Using the STDP model, synapse weight is updated with timing between (1) an axon spike in a pre-neuron and (2) a dendrite spike in a post-neuron.

In one embodiment, the neuromorphic system is a hardware implementation in which the synapse weights are stored in a memory chip, e.g., in random access memory (RAM), in a digital circuitry which generates neuron membrane potentials and synapse weights, modeling these effects with the leaky integrate and fire model of neuron and the STDP model of synapse weight update.

According to present principles, implementation of the system in hardware improves the speed of operations by approximately by $10^3$ times or more. Hardware implementation enables significantly more learning cycles to be computable within a practical operation timeframe and on a real-time on-system learning, e.g., an on-chip for neuromorphic chip. Hardware implementation based on a digital system makes the operation stable and free of fluctuations of device characteristics.

Figure 1:
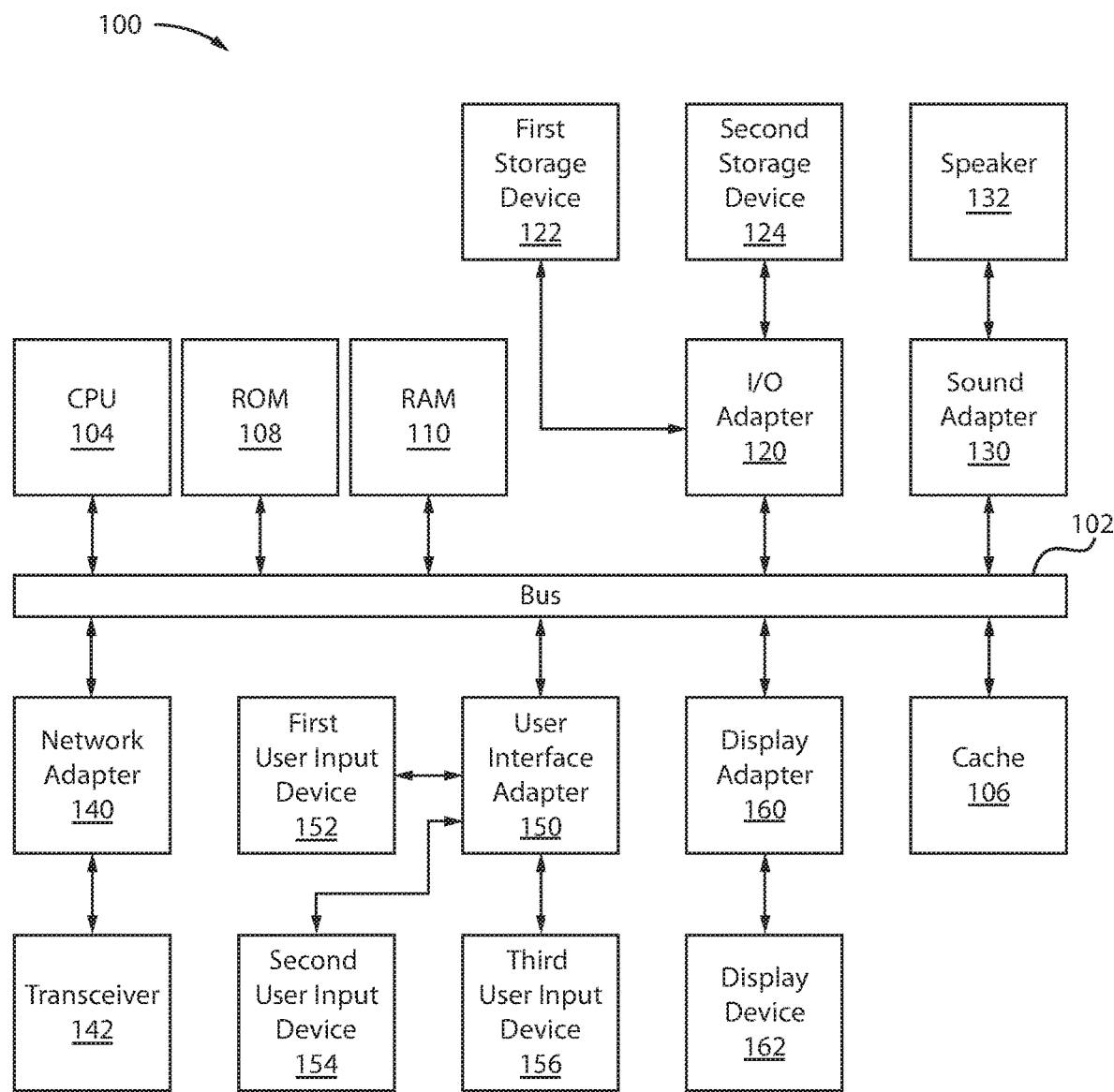
FIG. 1 an exemplary processing system to which the present principles may be applied.

Referring to FIG. 1, an exemplary processing system 100 to which the present principles may be applied is shown. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160 are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154 and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

The processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. It is to be appreciated that the terms processors and controllers can be used interchangeably herein. These and other variations of the processing system 100 are readily contemplated by one of ordinary skill in the art given the teachings of the present principles provided herein.

Figures 2, 3:
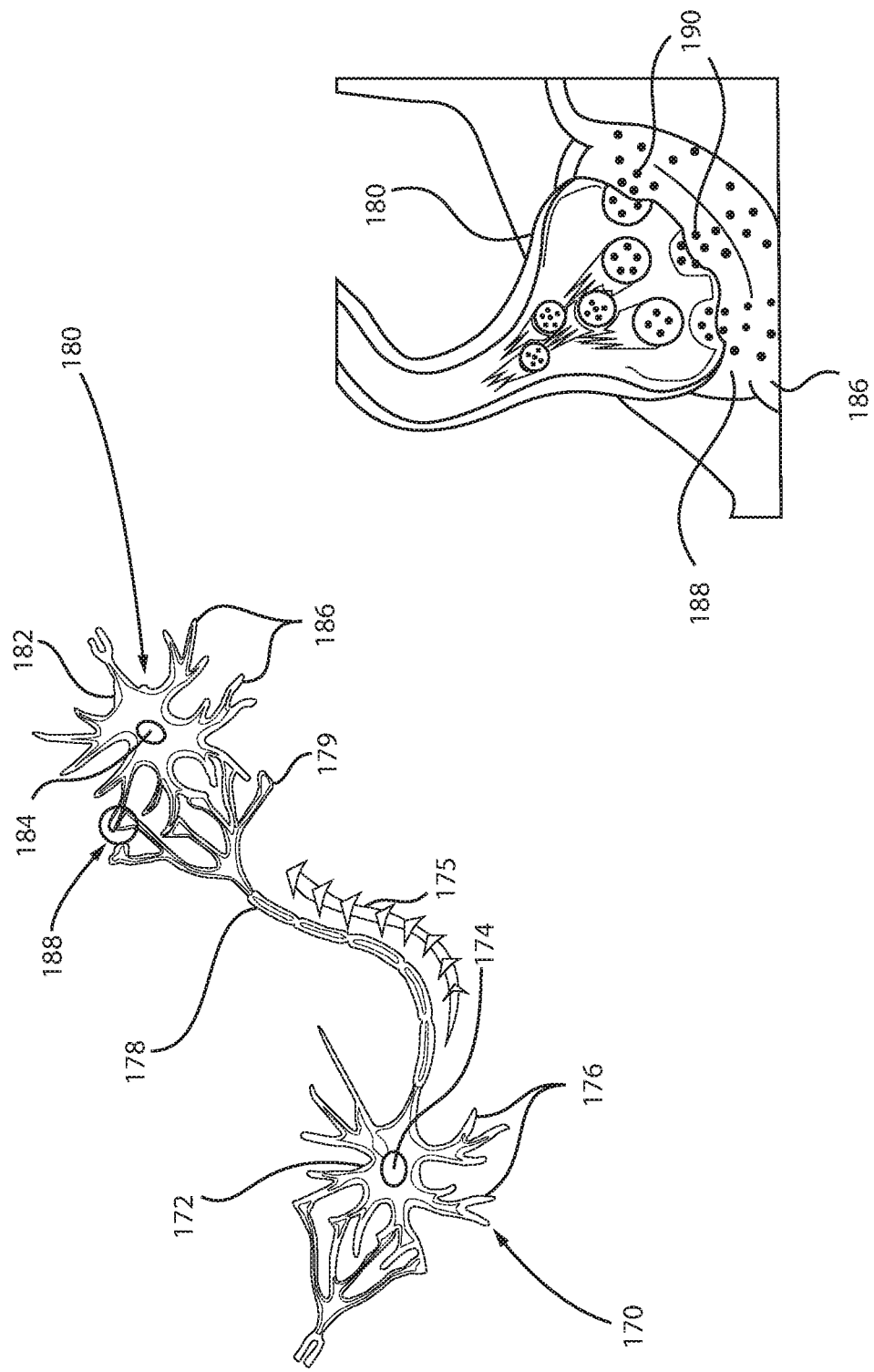
FIG. 2 depicts biological nerve cells and in particular, a pre-neuron and a post-neuron with an electrical signal transmitted across the axon of a pre-neuron axon and the synapse between the pre-neuron and post-neuron.
FIG. 3 depicts the circled area of FIG. 2 in additional detail, showing the synapse and the flow of neurotransmitters across the synapse.

FIG. 2 depicts a biological neuron and synapse structure. Two neurons, a pre-neuron 170 and a post-neuron 180, are depicted with the following cell parts: pre-neuron cell body 172, nucleus 174, dendrites 176, axons 178, and axon tips 179 of pre-neuron 170; post-neuron cell body 182, nucleus 184, and dendrites 186 of the post-neuron 180. A synapse 188 is present between an axon tip 180 of the pre-neuron 170 and a dendrite 186 of the post-neuron 180.

The synapse is shown in detail in FIG. 3. Electrical signal 175 is transmitted along the axon 178, axon tips 179 of the pre-neuron 170. In response to a threshold action potential or graded electrical potential, neurotransmitters 190 are released at the presynaptic terminal of the pre-neuron. The neurotransmitters 190 flow across the synapse 188 into dendrite of the post-neuron 180.

Each synapse has a characteristic synapse weight (SW) reflective of the strength of the connection. Synapse weight refers to the strength or amplitude of a connection between two nodes, corresponding in biology to the amount of influence the firing of one neuron has on another. According to present principles, synapse weight is updated according to the period between an axon spike of a pre-neuron and the dendrite spike of a post-neuron in following the spike time-dependent plasticity (STDP) synapse model.

Figure 4:
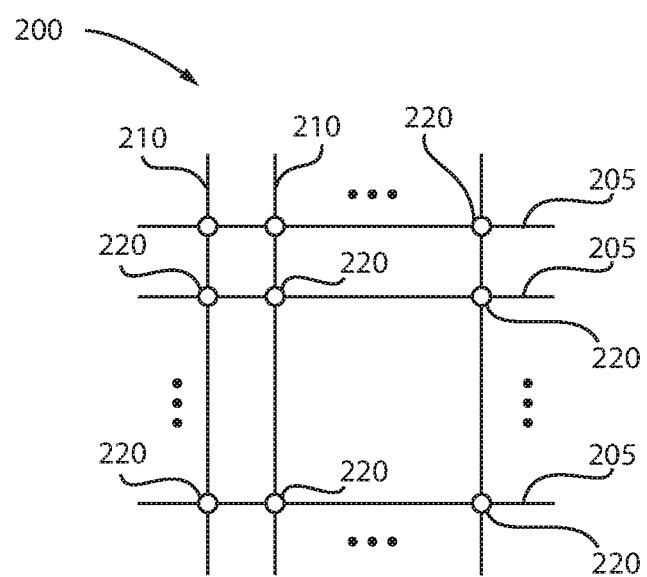
FIG. 4 depicts a crossbar structure of an artificial synapse network that can be employed in a system according to present principles, showing the axons, dendrites, and synapses formed by the network.

In a neuromorphic system modeled according to present principles, the synapses are arranged in a crossbar structure 200, as depicted in FIG. 4. The crossbar structure 200 comprises axon paths/wires 205 of pre-neurons and dendrite paths/wires 210 of post-neurons. The synapses 220 are located at cross-point junctions of each axon path 205 and each dendrite path 210. As such, each connection between an axon path 205 and a dendrite path 210 is made through a digital synapse 220.

The synapses 220 are aligned in an array, at the intersections of axon paths 205 of pre-neurons which extend horizontally, and the dendrite paths of post-neurons 210 which extend vertically. The synapses 220 are arranged as in the row and column lines of a memory array.

In this model, a post-neuron receives stimulus through a dendrite connected to a synapse, which raises the neuron membrane potential by a certain amount. On the other hand, leaky decay incrementally lowers the neuron membrane potential. A modeling based on the leaky integrate and fire model (LIF) accounts for this effect.

Figure 5:
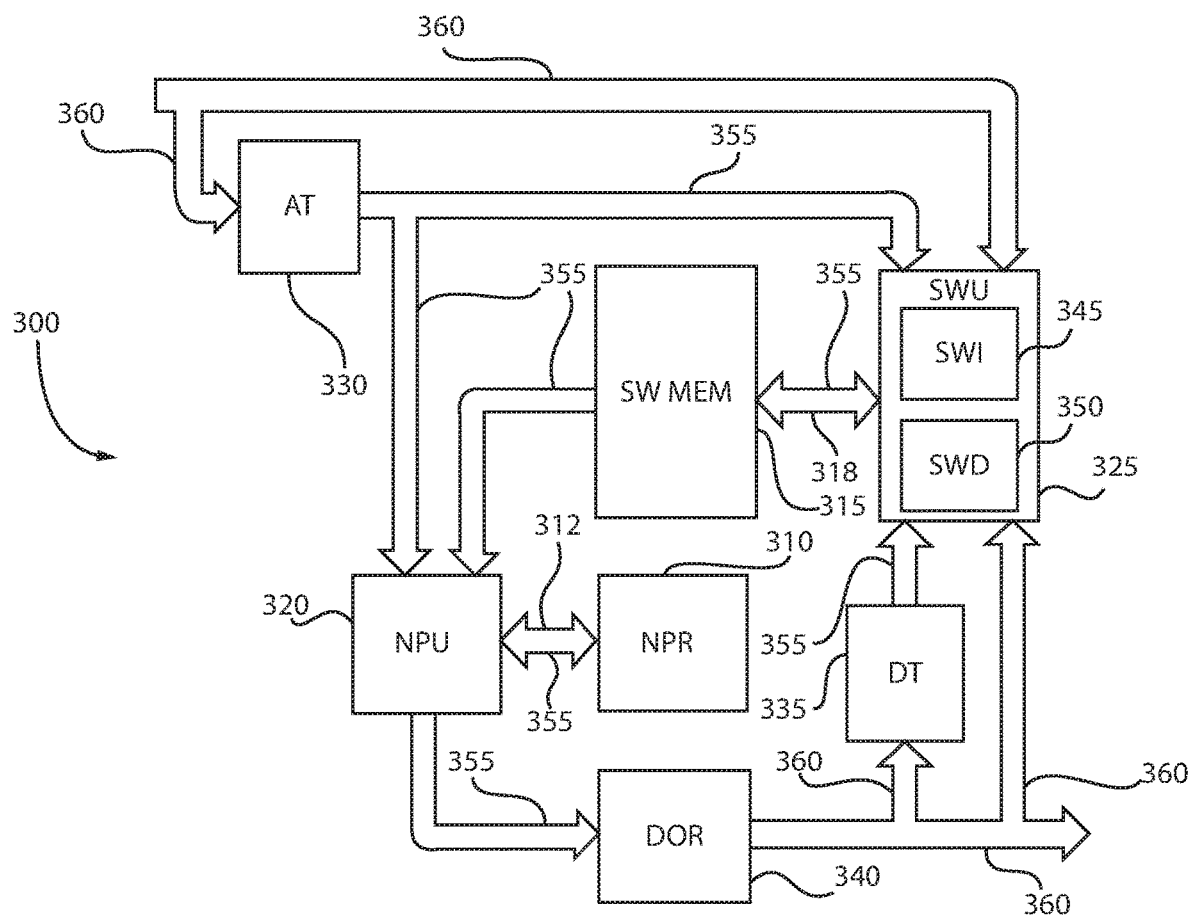
FIG. 5 depicts a block diagram of a digital neuromorphic system in accordance with present principles.

Referring to FIG. 5, a digital neuromorphic system 300 according to present principles is shown. The system is designed to digitally provide for STDP-synapse and LIF-neuron based neuromorphic effects with on-system learning through a hardware configuration. In this system, internal signals are processed serially, with serial flow paths being designated 355. External signals are processed in parallel and are designated 360.

As shown, the system is configured to include a neuron membrane potential register block 310 and synapse weight memory block 315. Circuit logic 312 updates the status of the neuron membrane potential register block 310 with information provided by axon timer block 330, synapse weight memory block 315 and neuron membrane potential register block 310. This updating takes place with serial processing. Circuit logic 318 updates the status of the synapse weight memory block 315 with information provided by axon timer block 330, dendrite timer block 335 and synapse weight update block 325 and is processed serially. An axon timer block 330 and a dendrite timer block 335 are provided to monitor the elapsed times since the occurrences of axon input spikes and an output dendrite spikes, respectively. External signals are provided in parallel to the axon timer block 330, while its output processed in serial. A parallel signal from a dendrite output register block 340 arrives at the dendrite timer block 335. Output signals from the dendrite timer block are processed in serial. The dendrite output register block 340 converts serial signals to parallel between the internal processing blocks and external parallel signal ports.

The neuron membrane potential register block (NPR) 310 stores the neuron membrane potential (NP). Neuron membrane potential register block (NPR) 310 can be included in a digital processor, such as the central processing unit (CPU) of a computing device. In one embodiment, a register block is employed for a neuromorphic system with a large number of synapses. In another embodiment, where the system represents a small number of synapses, a memory element such as latch or flip flop can be employed.

The synapse weight memory block (SW MEM) 315 stores the synapse weight (SW). Any kind of rewritable memory, without regard to whether it is volatile or non-volatile memory, can be employed in the synapse weight memory block. In one embodiment, memory with both row only access and column only access may be employed.

The neuron membrane potential update block (NPU) 320 updates neuron membrane potential values, employing the elapsed time information from the axon timer block 330, synapse weight values from the synapse weight memory block 315, and the neuron membrane potential from the neuron membrane potential register block 310. The neuron membrane potential update block 320 also determines whether the neuron membrane potential reaches a certain threshold value in order to generate a neuron fire signal. Since neuron membrane potentials exhibit leaky decay as a result of the "calm down" of a neuron, the neuron membrane potential update block makes updates of the neuron membrane potential values based on the leaky integrate and fire (LIF) model. A write operation is preformed to update the neuron membrane potential values in neuron membrane potential register 310, e.g., updated neuron membrane potential values determined in neuron membrane potential update block 320 are written to the neuron membrane potential register 310.

The synapse weight update block (SWU) 325 updates the synapse weight value with the elapsed time information provided by the axon timer block 330 and the dendrite timer block 335 together with the current synapse weight value obtained from the synapse weight memory block 315. The elapsed time represents the time between an axon input spike and a dendrite output spike. Synapse weight values in the synapse weight memory block 315 are updated in a write operation. The update values are determined by the synapse weight update block 325.

The synapse weight update block 325 includes two independent blocks, which are shown as synapse weight increment block (SWI) 345 and synapse weight decrement block (SWD) 350. The synapse weight update block 325 runs an algorithm based on the spike-time dependent plasticity (STDP) rule. The synapse weight update block 325, the synapse weight increment block 345, and the synapse weight decrement block 350 implement STDP-based on-system learning.

In an exemplary STDP protocol, synapse weight is updated (modified) by receiving the neuron fire spike of a pre-neuron (or pre-synaptic neuron) through an axon node shortly before or shortly after the neuron fire spike of the post-neuron (or post-synaptic neuron) appears in a dendrite node. For example, injecting at least two spike pulses to the nodes of the synapse within a certain short period will cause a change in synapse weight, e.g., a synapse weight update event. The neuron fire event occurs once in several milliseconds asynchronously and concurrently in parallel for all neurons. The synapse weight update occurs not so rapidly in response to these neuron fire events (event driven base). The detailed update scheme and amount of the synaptic weight may be implemented inside the SWI 345 and SWD 350, in consideration of the device performance measurement or simulation results. The update amount (change in synapse weight) can be plotted as a function of the relative arrival time difference of a pre-synaptic neuron fire spike and a post-synaptic neuron fire spike.

The axon timer block 330 includes the timers for all axons in the system. The axon timer block 330 measures the elapsed time since axon input signals have been received from outside of the system. The dendrite timer block 335 includes the timers for all dendrites in the system. The dendrite timer block 335 measures the elapsed time since dendrite output signals, e.g., neuron fire signals, generated by neuron membrane potential update block 320 for the post-neuron.

The dendrite output register block (DOR) 340 provides serial to parallel conversion of dendrite output, e.g., neuron fire signals. Whereas internal signals are processed serially, the external interface is in a parallel arrangement.

The above-described system components allow for quick verification and the debugging of complicated STDP-based on-system learning and LIF neuron functions prior to manufacturing system-based hardware in silicon. For example, the system can be entirely simulated in hardware. Also, hardware can be implemented with reconfigurable logic circuits, for example field-programmable gate arrays (FPGAs).

Figure 6:
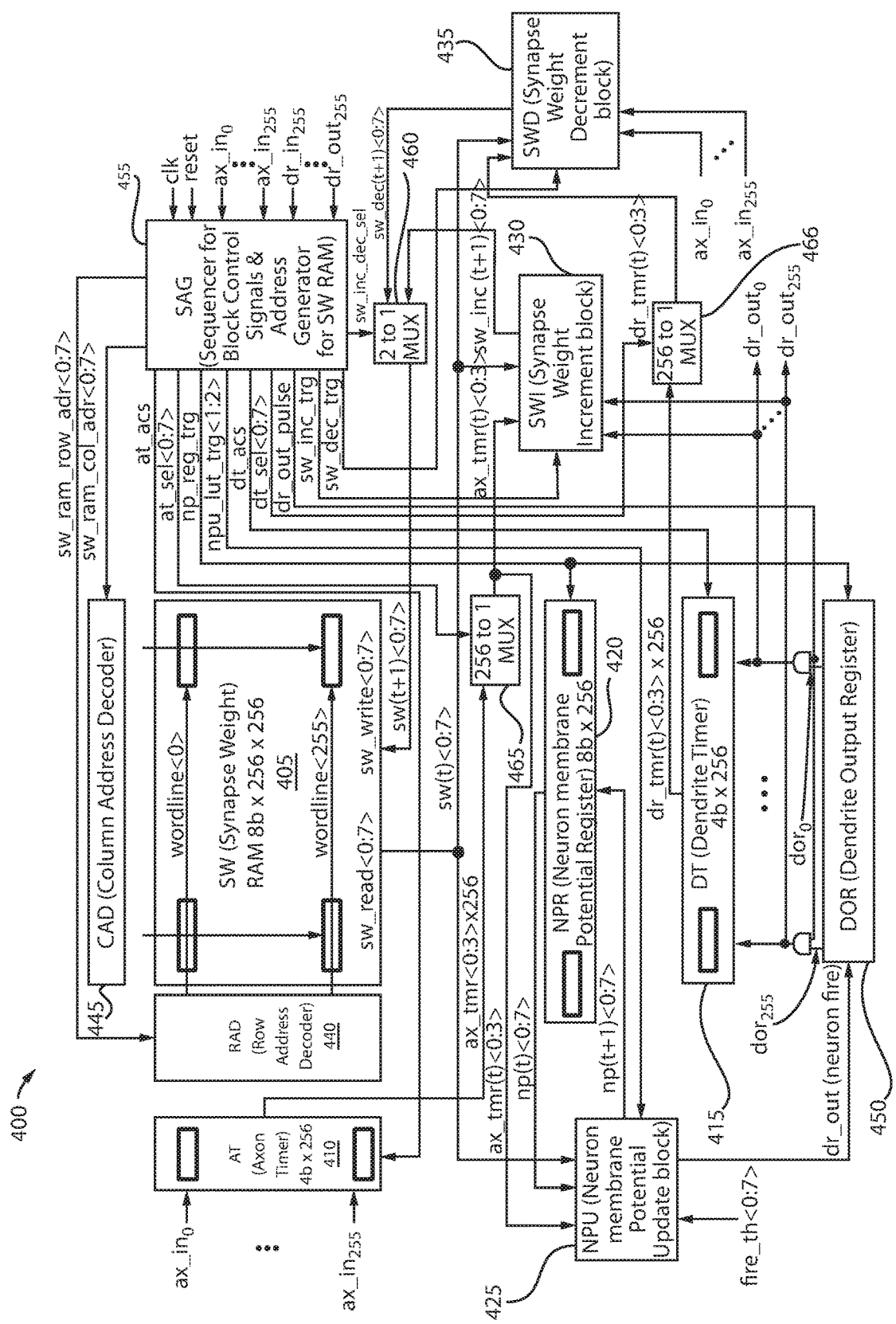
FIG. 6 depicts a detailed block diagram of a digital neuromorphic system in accordance with the present principles.

FIG. 6 shows a block diagram of a neuromorphic system 400 according to present principles. In one embodiment, the neuromorphic system 400 implements the crossbar structure 200 for synapses as shown in FIG. 4. The crossbar structure is implemented in synapse weight RAM (SW RAM) block 405. Synapse weight RAM block 405 can be any type of RAM, for example SRAM, DRAM or NVRAM etc. In one embodiment, there are 256 neurons and 256×256=65536 synapses. These number can be modified in accordance with the target application specifications.

The synapse weight data for the synapses are stored in the synapse weight RAM block 405. For example, the synapse weight data can be stored eight (8) bit each. The rows and columns of the synapse weight RAM blocks respectively correspond to axons of pre-neurons and dendrites of post-neurons. By way of example, synapse weight RAM (i, j) respectively represents the synapse weight of a synapse between axon i and neuron body j (or dendrite j).

Spike timing is one of the parameters accounted for in STDP model. The axon timer 410 and the dendrite timer 415 respectively determine the elapsed time since a spike appears in the axon and in the dendrite nodes of the synapses. This data is independently stored in 4 bit for the (256) axons and the (256) dendrites. The spike time data is read out and utilized one by one sequentially as instructed by the sequencer for block control signals and address generator for the synapse weight RAM (SAG) unit 455 (hereinafter "SAG"). For axon timer 410 and the dendrite timer 415 to determine elapsed times, data is accessed by AT access signal (at_acs) and DT access signal (dt_acs) generated by the SAG 455. The timing data is stored in 4 bit lengths for all axons and dendrites, but bit lengths can be selected based on the application of the system. In order to select one AT and one DT data out of 256 AT data and 256 DT data, respectively at a given time, the 8-bit select signals at_sel<0:7> and dt_sel<0:7> are, for example, incremented from 0 to 255 according to the operation state. Axon input spike signals ax_in$_i$, where i is 0 to 255, is provided to the axon timer 410 and SAG 455 as an external system signal that is processed in parallel.

The neuron membrane potential register 420 stores the neuron membrane potential (NP) for each neuron and shows the status of the neuron as digital quantized value. In an excitatory neuron, the neuron membrane potential increases every time the neuron receives a spike, e.g., a stimulus from axons, e.g., the axons ax_in$_i$, where i is 0 to 255, through connected synapses 220, as shown in FIG. 4. The neurons are stimulated through synapses until the neuron membrane potential reaches a certain level that is also called the fire threshold level. The signal fire_th<0:7> gives the fire threshold level of the neurons which is given from outside of the system as one of the operation parameters. With an inhibitory neuron, the neuron membrane potential decreases when the neuron receives a spike and it can be implemented in the same way. For present discussion purposes, only the excitatory neurons are considered.

The neuron membrane potential is read out from neuron membrane potential register 420 and updated in the neuron membrane potential update block (NPU) 425. The updated value is written into neuron membrane potential register (NPR) 420. The amount that the neuron membrane potential is updated is determined by the corresponding axon timer 410 value and the corresponding synapse weight amount. Thus the greater the axon timer value and the synapse weight value are, the greater the neuron membrane potential is increased. This process is repeated in implementing the integration function of the neuron membrane potential value. Once the neuron membrane potential reaches the threshold level, the potential is reset (or preset) to its initialization level. If the neuron membrane potential value should be initialized to a certain level (yet avoiding GND or zero potential level) as a result of timing, the user can specify the preset level by way of an instruction given from outside of the system. The timing values obtained from the axon timer 410 and synapse weight values for the corresponding synapses are used by the neuron membrane potential update block 425 to determine the incremental change in the neuron membrane potential. The neuron membrane potential update block 425 implements this operation while accounting for the leaky decay of the neuron membrane potential by implementing the leaky integrate and fire model. Of note, the leaky decay effect of the leaky integrate and fire model is implemented inside the neuron membrane potential update block (NPU) 425 after the integration operation, with data concerning axon timer values, synapse weight values and current neuron membrane potential values.

In implementing the leaky integrate and fire function, the neuron membrane potential update block 425 receives the current axon timer signal ax_tmr(t)<0:3> from axon timer 410, the current synapse weight signal sw(t)<0:7> from synapse weight RAM 405, and the current neuron membrane potential signals np(t)<0:7> from the neuron membrane potential register block 420. The access control and trigger signals at_acs, at_sel<0:7>, sw_ram_row_adr<0:7>, sw_ram_col_adr<0:7> and np_reg_trg as well as npu_lut_trg<1:2> are generated by the SAG 455 to supply input signals for the neuron membrane potential update block 425. The neuron membrane potential update block 425 applies in the leaky decay effect and generates a current neuron membrane potential value as an output signal.

The neuron membrane potential register 420 data is updated with updated neuron membrane potential data (np(t+1)<0:7>) from the neuron membrane potential update block 425. The sequence and data flow is controlled by the SAG 455.

The STDP model uses spike timing information for the synapse weight update operation. Spike Timing Dependent Plasticity (STDP) is a temporally asymmetric form of Hebbian learning induced by tight temporal correlations between the spikes of pre- and post-synaptic neurons. As with other forms of synaptic plasticity, it is widely believed that it underlies learning and information storage in the brain, as well as the development and refinement of neuronal circuits during brain development.

The synapse weight increment block 430 and the synapse weight decrement block 435 respectively perform increments and decrements in synapse weight values. The amount of change in synapse weight value, e.g., the amount of increment or the amount of decrement in synapse weight value, are determined with the current (256) axon timer values obtained from the axon timing block 410 (ax_tmr(t)<0:3>), current 256 dendrite timer values obtained from the dendrite timing block 415 (dr_tmr(t)<0:3>), and the current synapse weight values obtained from the synapse weight RAM 405 (sw_read<0:7>). The synapse weight update is triggered by any one of axon input spike signals ax_in$_i$ (for i=0 to 255) or any one of dendrite output spike signals dr_out$_j$ (for j=0 to 255). For example, if one axon input spike occurs on ax_in$_i$, a synapse weight decrement calculation is performed for the synapse weight only in row "i" (sw$_{ij}$; for j=0 to 255). The 256 to 1 MUX 466 selects one of the dendrite timer value dr_tmr(t)<0:3> from the 256 dendrite timer values (dr_tmr(t)<0:3>×256) for dendrite$_0$ to dendrite$_{255}$ (or for neuron$_0$ to neuron$_{255}$). The selection changes with the dt_sel<0:7> signals from dendrite$_0$ to dendrite$_{255}$ (or from neuron$_0$ to neuron$_{255}$) for sequential process in synapse weight detriment block 435. On the other hand, if there is one dendrite output spike only on dr_out$_j$ a synapse weight increment calculation is performed for the synapse weights in column "j" (sw$_{ij}$; for i=0 to 255). The 256 to 1 MUX 465 selects one of the axon timer value ax_tmr(t)<0:3> from 256 axon timer values (ax_tmr(t)<0:3>×256) for axon$_0$ to axon$_{255}$. The selection changes with the at_sel<0:7> signals from axon$_0$ to axon$_{255}$ for sequential process in synapse weight increment block 430. Output values from synapse weight increment block 430 (sw_inc(t+1)<0:7>) and the current synapse weight decrement block 435 (sw_dec(t+1)<0:7>) are triggered by signals sw_inc_trg and sw_dec_trg, respectively generated by SAG 455. The information is processed by a 2 to 1 multiplexor unit 460, selecting either the sw_inc(t+1)<0:7> value or sw_dec(t+1) <0:7> value as updated synapse weight data sw(t+1)<0:7> to synapse write port (sw_write<0:7>) in 8 bit. Thus updated synapse weight information is written to the SW RAM unit 405.

Row Address Decoder 440 and Column Address Decoder 445 decode row and column addresses of the synapse weight RAM 405, responsive to instructions from sequencer unit 455 (sw_ram_row_adr<0:7> and sw_ram_col_adr<0:7>, respectively), which are used for read and write access to the synapse weight RAM 405. The read access is performed to obtain current synapse weight value sw(t)<0:7> obtained from the read data output port sw_read<0:7>. For write access, the updated synapse weight value sw(t+1)<0:7> is given to the write data input ports sw_write<0:7>, replacing the current value sw(t)<0:7> in write access. As indicated, the timing of the sequences for these operations are generated by sequencer for block control signals and address generator for synapse weight RAM block (SAG) 455.

Figure 7A:
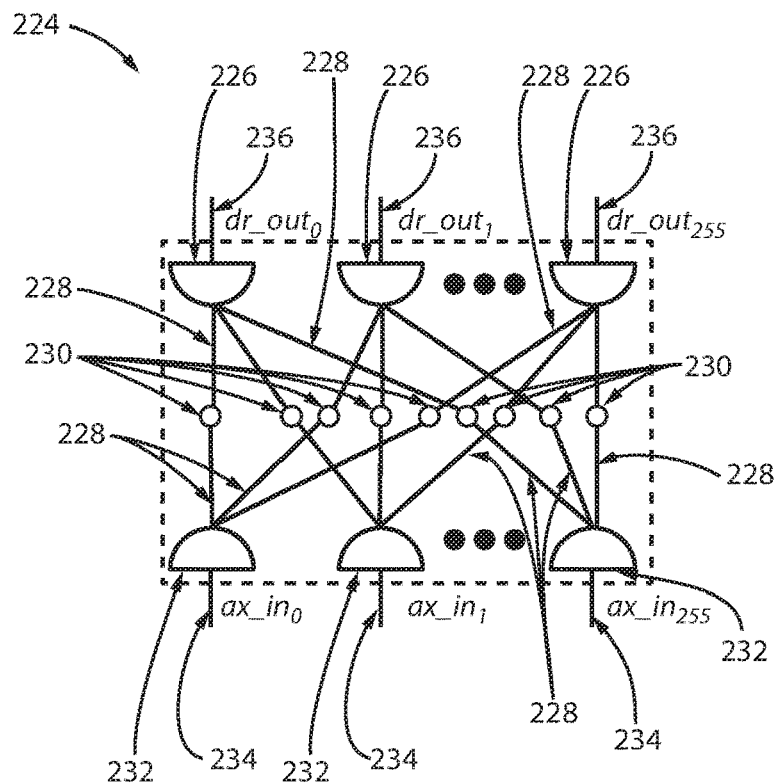
FIG. 7A depicts a single-core system without feedback connection that can be used with the neuromorphic system of FIG. 6.

Referring to FIG. 7A, depicted is a single-core system 224 without feedback connection that can be used with the neuromorphic system of FIG. 6. The axon input signals ax_in$_i$ (for i=0 to 255), denoted 234, are the input signals supplied from outside the system in a single-core system without feedback connection. As shown, the single-core system 224 includes axon drivers of pre-neurons 232, neuron bodies with dendrite drivers of post-neurons 226, and synapses 230 in operative communication with same through connectors 228. In this arrangement, the dendrite output signals dr_out$_j$(for j=0 to 255), denoted 236, are the system external output signals, e.g., signals that are supplied outside of the system 224.

Figure 7B:
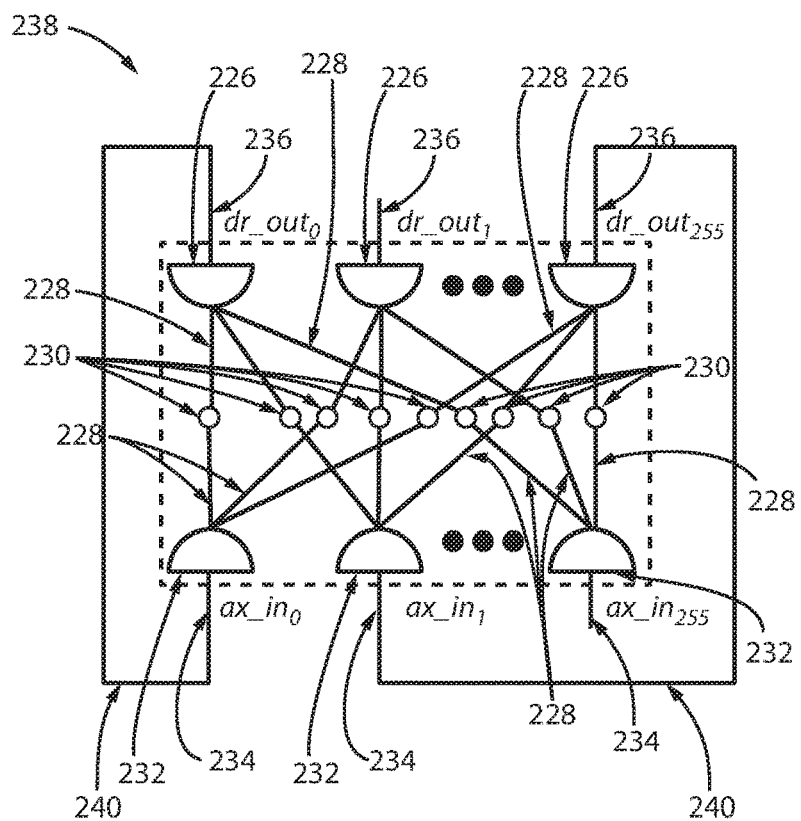
FIG. 7B depicts a single-core system with feedback connections that can be used with the neuromorphic system of FIG. 6.

Referring to FIG. 7B, shown is a single-core system 238 with feedback connections that can be used with the neuromorphic system of FIG. 6. As for the single-core system with feedback connection, one or more ax_in$_i$ signals, e.g., denoted 234, are connected with dr_out$_j$ signals 236 with feedback connections 240. The feedback connections 240 create internal system signals between ax_in$_i$ signals 234 and dr_out$_j$ signals 236.

Figure 7C:
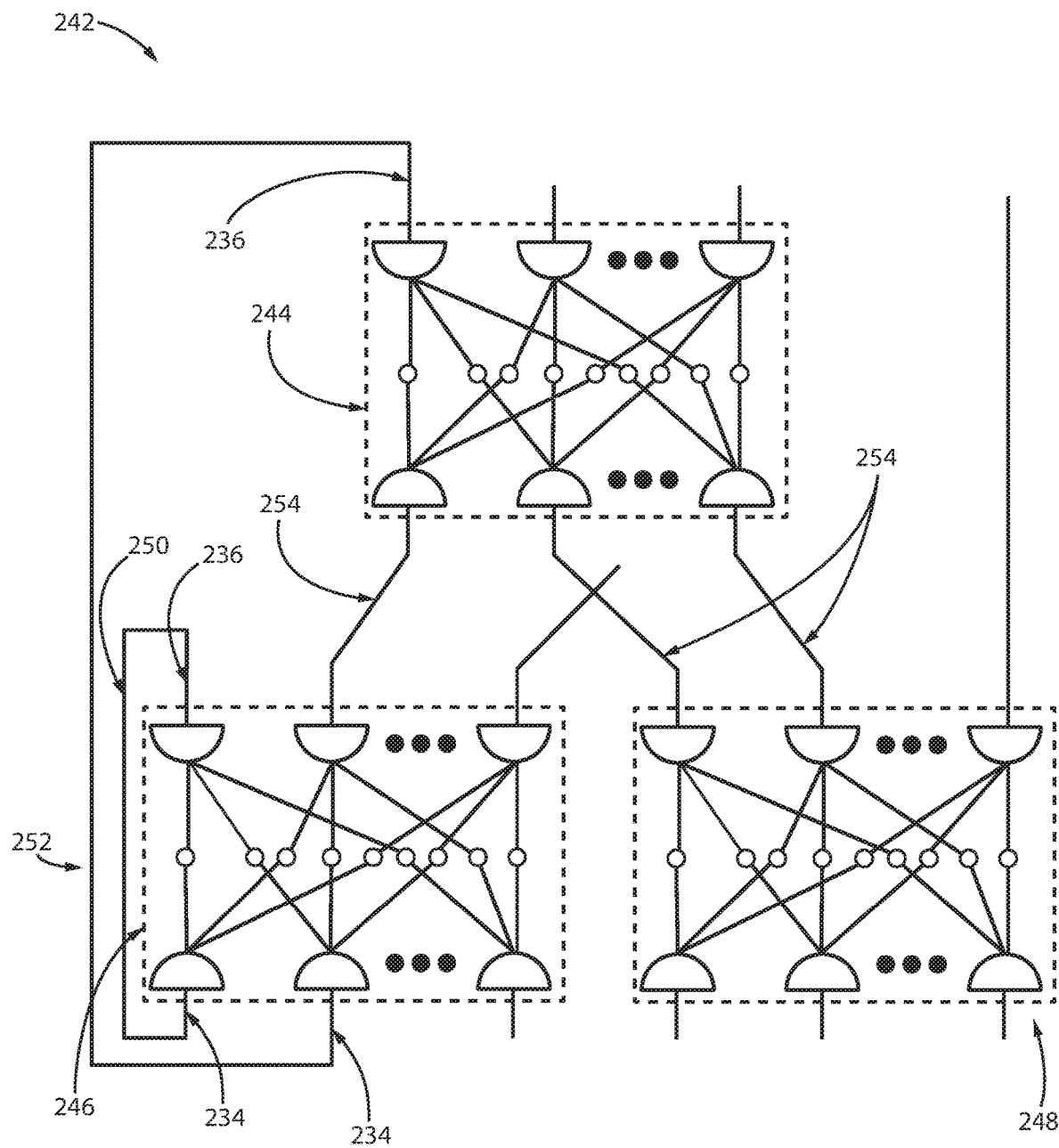
FIG. 7C depicts a multi-core system that can be used with the neuromorphic system of FIG. 6.

Referring to FIG. 7C, depicted is a multi-core system 242 that can be used with the neuromorphic system of FIG. 6. The multicore system 242 three (3) system cores, denoted 244, 246, and 248, configured internally in the same manner as systems 224 and 238 described above, so that numbering of like parts is omitted here. With system 246, shown is an internal feedback connection 250 between an ax_in$_i$ and a dr_out$_j$ of this system. Furthermore, a dendrite output (dr_out$_j$) of system 246 is connected to an ax_in$_i$ of system 244 via connector 254. System 248 is also connected to system 244 via dr_out$_j$ to ax_in$_i$ by connectors 254. Still further, a dr_out$_j$ of system 244 is connected to an ax_in$_i$ of system 246 by a connector 252. These arrangements provide for transferring signals internally system-to-system.

Inside a core, the post-neuron output signals dr_out$_j$ (for j=0 to 255) are generated as the "neuron fire" signals (e.g., dr_out (neuron fire)). Referring to FIG. 6, the neuron fire signals are forwarded from neuron membrane potential update block 425 and sent to the dendrite output register (DOR) 450. The "neuron fire" signals of post-neurons may be fed back to the synapse array in the same core and transferred to system external system output. For the system with feedback connection or multi-core system, the connections between the dendrite output (dr_out$_j$) and the axon input (ax_in$_i$) are determined by the system user or designer.

According to these connections, the system can be single-core system with or without feedback connection or a multi-core system. For a single-core system, the self-connections can be implemented as feedback connections. If the core has two modes, that is, a learning mode and non-learning mode, the fire signals of post-neurons are supplied to the dendrites of the corresponding synapses only in the learning mode based on STDP model. That is only the synapse weight values connecting to that neuron are targets for the synapse weight increment.

The dendrite output register 450 converts the serial dr_out (neuron fire) signal to parallel signals (dor$_0$ . . . dor$_{255}$) to provide parallel input to the synapse and core output dr_out$_j$ (for j=0 to 255). These core output signals are system external output for single-core system without a feedback connection. For other cases, one or some of these output signals are connected to ax_in$_j$ (for i=0 to 255) of other core itself. In this way the system with a feedback connection or the multi-core system can be implemented by appropriate connections between dr_out$_j$ of one core to ax_in$_i$ of the same core.

According to present principles, the system described herein provides a design platform a neuromorphic system for STDP synapse and LIF neuron-based neuromorphic system. The system, which employs several function blocks as described (e.g., axon timer, dendrite timer, neuron membrane potential register, neuron membrane potential updater, synapse weight memory, synapse weight incrementer, synapse weight decrementer, sequencer and dendrite output register) is implemented in hardware, which provides for faster design speeds and more efficient uses of system resources. The function of the blocks and the various interface between the blocks is also described. The circuitry of the blocks can be freely implemented by the system designer freely and easily. Further by making this structure as a neuromorphic function unit core, multi-core system as well as single-core system with or without feedback paths can be implemented effectively with the simple definition of external connections.

Figure 8:
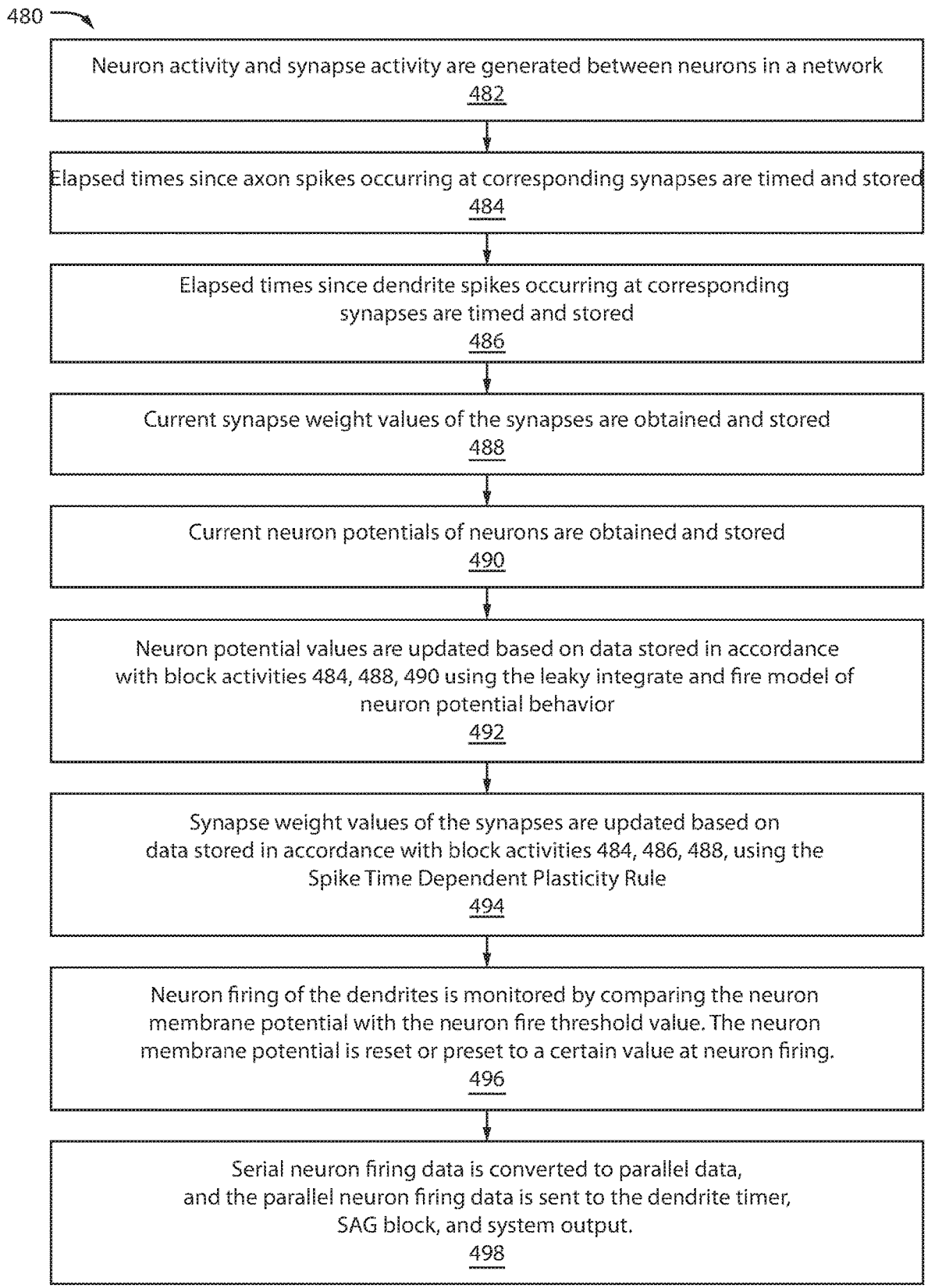
FIG. 8 depicts a block diagram of a method of modeling spike time-dependent plasticity (STDP) and leaky integrate and fire (LIF) in a digital neuromorphic system in accordance with an embodiment of the present principles.

Referring to FIG. 8, a method 480 for generating neuron activity neuromorphic system with spike time-dependent plasticity modeling and leaky integrate and fire modeling in accordance with present principles will now be described which method can be practiced through a hardware implementation.

In block 482, neuron activity and synapse activity are generated between neurons in a network. e.g., the crossbar network of axons, dendrites and synapses as depicted in crossbar network 200 of FIG. 4. In one embodiment, the crossbar network is embodied in a random access memory. In one embodiment employing the aforedescribed system in accordance with present principles, the system input is sent to the axon timer, the SAG block, and the synapse weight decrement block. In one embodiment, the input is sent singularly to a single core network or in parallel to a multicore network.

In block 484, the elapsed times since axon spikes occur at corresponding synapses are timed and stored. As indicated, an axon timer may be used to measure the elapsed times since axon spikes occur.

In block 486, the elapsed times since dendrite spikes occur at corresponding synapses are timed and stored. As indicated, a dendrite timer may be used to measure the elapsed times since dendrite spikes occur.

In block 488, the current synapse weight values of the synapses are obtained and stored, for example, in a synapse weight memory unit.

In block 490, the current neuron membrane potentials of neurons is obtained and stored, for example, in a neuron membrane potential register.

In block 492, the neuron membrane potential values are updated based on data stored in accordance with the above-mentioned block activities, namely storing the elapsed time since the occurrence of axon spikes in block 484, storing the current synapse weight values of the synapses in accordance with block 488, and storing the current neuron membrane potential of the neurons in accordance with block 490. The update of neuron membrane potential values is determined using the leaky integrate and fire model of neuron membrane potential behavior.

In block 494, the synapse weight values of the synapses are updated based on data stored in accordance with the above-mentioned block activities, namely storing the elapsed times since the occurrence of axon spikes in block 484, storing the elapsed times since the occurrence of dendrite spikes in block 486, and storing the current synapse weight values of the synapses in block 488, the update of synapse weight values being based on the spike time-dependent plasticity rule.

In block 496, neuron firing of the dendrites is monitored by comparing the neuron membrane potential with the neuron fire threshold value. The neuron membrane potential is reset or preset to a certain value at the neuron firing.

In block 498, serial neuron firing data is converted to parallel data, and the parallel neuron firing data is sent to the dendrite timer, SAG block, and system output.

Figure 9:
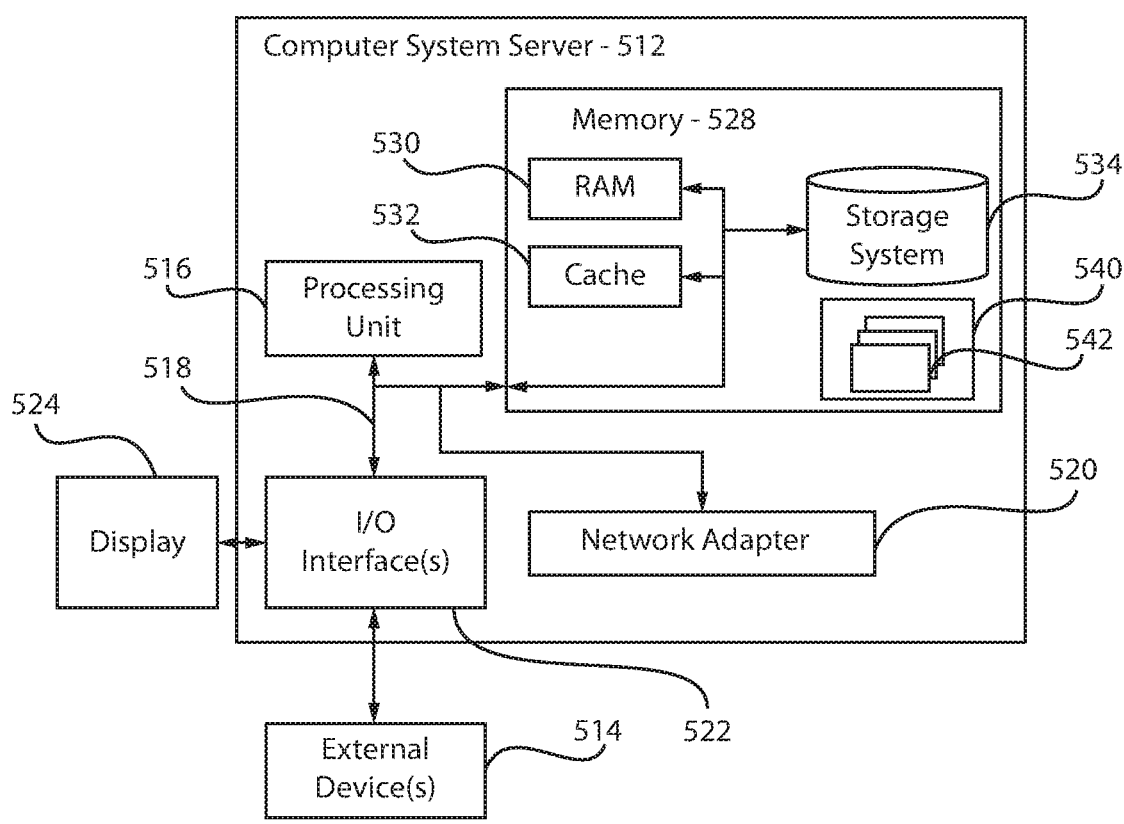
FIG. 9 shows an exemplary cloud computing node in accordance with an embodiment representative of a node for requesting cloud computing services.

Referring now to FIG. 9, a schematic of an example of a cloud computing node 510 is shown. Cloud computing node 510 is only one example of a suitable cloud computing node and is not intended to suggest any limitation as to the scope of use or functionality of embodiments of the invention described herein. Regardless, cloud computing node 510 is capable of being implemented and/or performing any of the functionality set forth hereinabove.

In cloud computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 512 in cloud computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Figure 10:
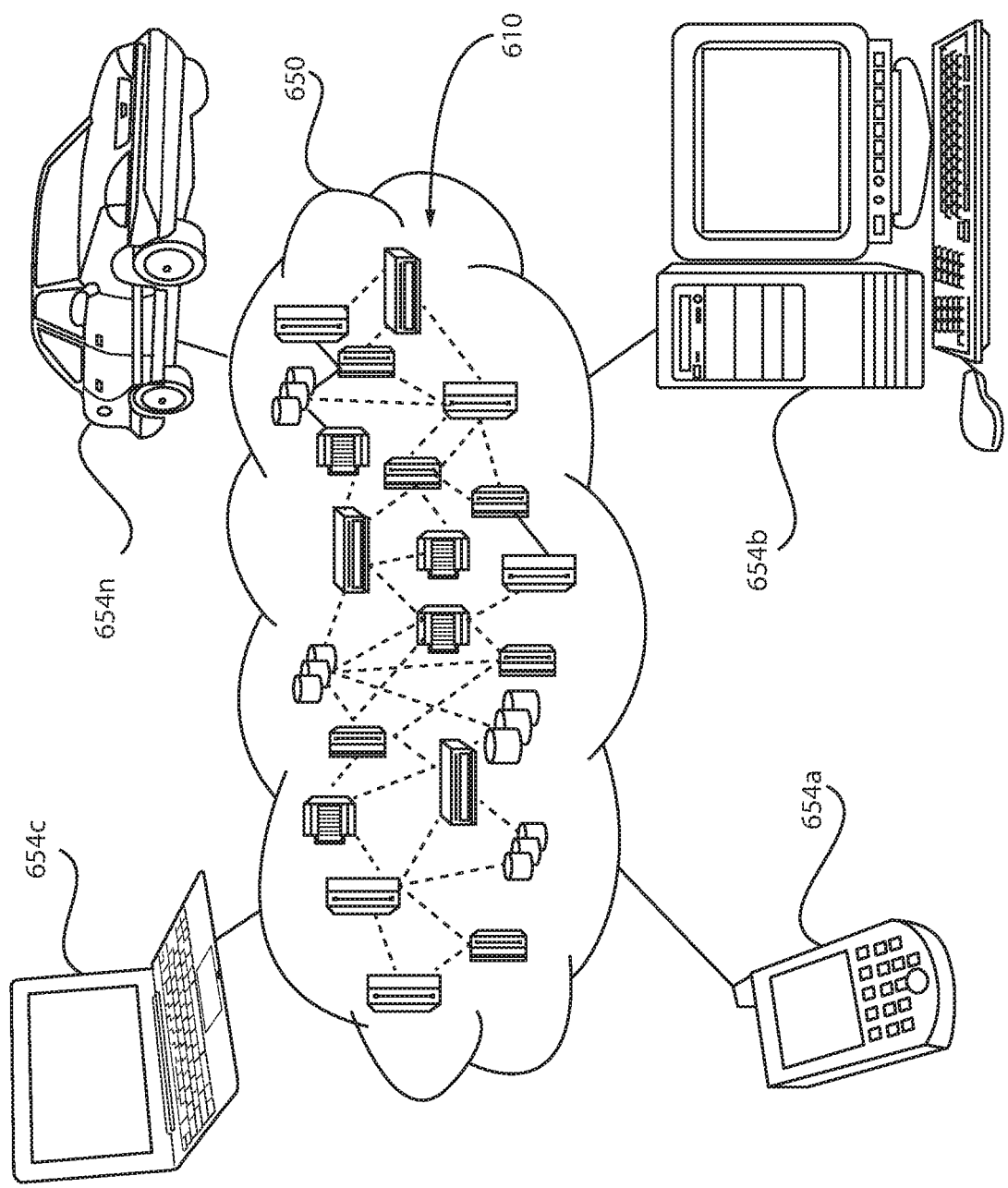
FIG. 10 shows an exemplary cloud computing environment in accordance with an embodiment of the present principles that is representative of a computing environment in which present neuromorphic network principles may be applied.

Referring now to FIG. 10, illustrative cloud computing environment 650 is depicted. As shown, cloud computing environment 650 comprises one or more cloud computing nodes 610 with which client devices 654 used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of devices 654A-N are intended to be illustrative only and that computing nodes 610 and cloud computing environment 650 can communicate with any type of computerized device over any type of network and/or network addressable connection (e.g., using a web browser).

Figure 11:
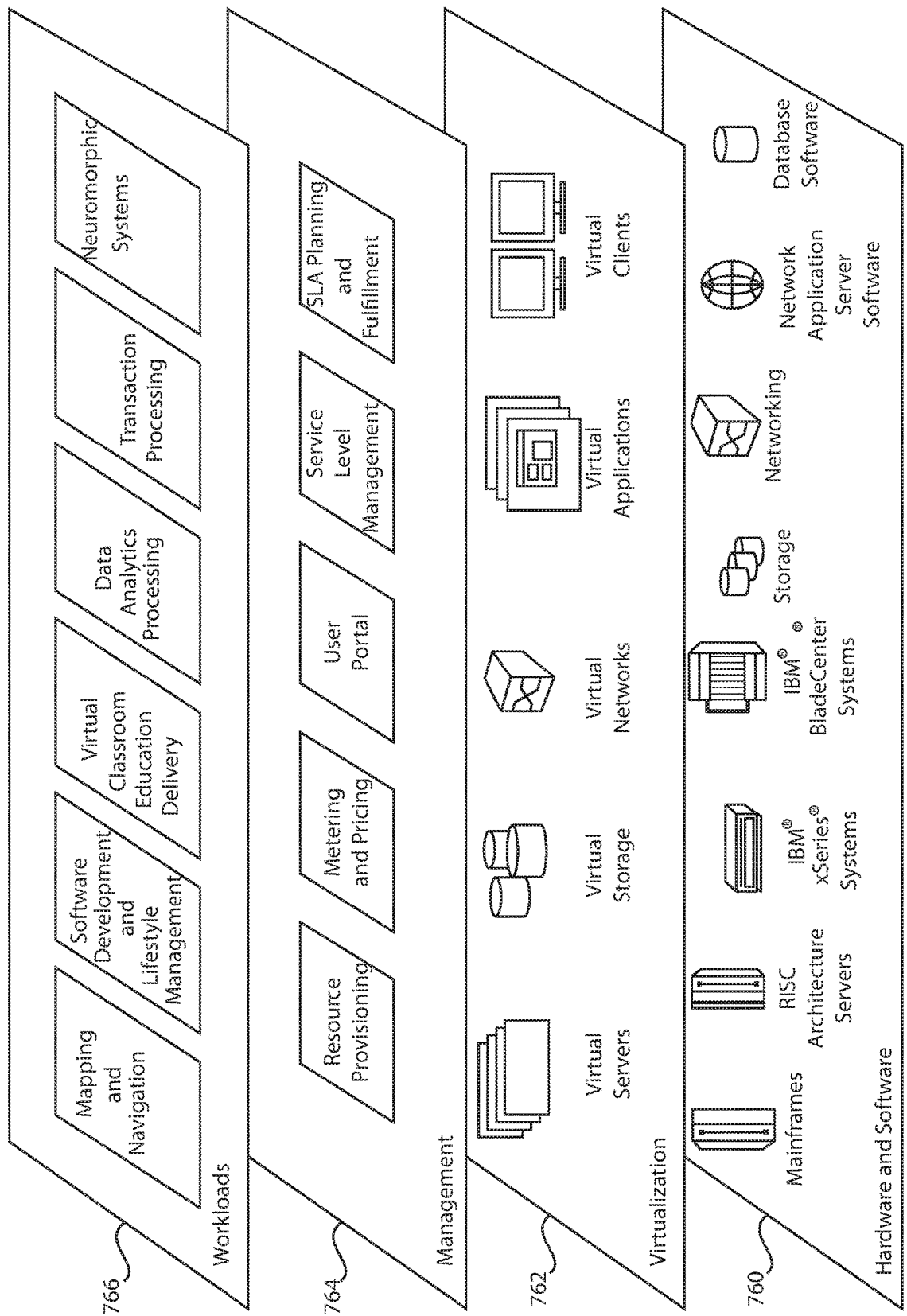
FIG. 11 shows exemplary abstraction model layers provided by cloud computing environment that could be subject of a neuromorphic system embodying the present principles.

FIG. 11 shows a set of functional abstraction layers provided by cloud computing environment 650. It should be understood in advance that the components, layers, and functions shown in FIG. 11 are intended to be illustrative only and embodiments of the invention are not limited thereto. As depicted, the following layers and corresponding functions are provided:

Hardware and software layer 760 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 762 provides an abstraction layer from which the following examples of virtual entities may be provided: virtual servers; virtual storage; virtual networks, including virtual private networks; virtual applications and operating systems; and virtual clients.

In one example, management layer 764 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 766 provides examples of functionality for which the cloud computing environment may be utilized. Examples of workloads and functions which may be provided from this layer include: mapping and navigation; software development and lifecycle management; virtual classroom education delivery; data analytics processing; transaction processing; and neuromorphic systems.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of neuromorphic systems, which are intended to be illustrative and not limiting, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A neuromorphic system for generating neuron activity, comprising, in a hardware implementation:
   an axon spike timer to determine the elapsed time between occurrences of axon spikes in synapses between neurons;
   a dendrite spike timer to determine the elapsed time between occurrences of dendrite spikes in synapses between neurons;
   a neuron membrane potential register where current neuron membrane potential values are stored, operatively coupled to a neuron membrane potential updating logic;
   a memory unit that stores current values of synapse weights;
   the neuron membrane potential updating logic that determines neuron membrane potential values based on a leaky integrate and fire model of neuron membrane potential behavior, operatively coupled to the axon timer, the memory unit, the neuron membrane potential register and dendrite output register; and
   a dendrite output register that converts serial neuron fire data signals to parallel neuron fire data signals.

2. The neuromorphic system of claim 1, further comprising:

a synapse weight updating logic that determines updated synapse weight values based on the spike time-dependent plasticity rule, operatively coupled to the axon timer, the dendrite timer, and the memory unit.

3. The neuromorphic system of claim 2, wherein the synapse weight update logic is comprised of a synapse weight incrementer, for registering increments in synapse weights, and a synapse weight decrementer, for registering decrements in synapse weights.

4. The neuromorphic system of claim 1, further comprising:
a neuron network for generating neuron activity and synapse activity between neurons.

5. The neuromorphic system of claim 1, further comprising a neuron network having inputs, for receiving parallel neuron fire signals of pre-neurons from the dendrite output register and inputting the signals to axons of the neuron network.

6. The neuromorphic system of claim 1, further comprising a neuron network having a crossbar configuration of axons and dendrites that intersect at synapses.

7. The neuromorphic system of claim 1, further comprising a single core neuron network without a feedback connection for generating neuron activity and synapse activity between neurons.

8. The neuromorphic system of claim 1, further comprising a single core neuron network with a feedback connection for generating neuron activity and synapse activity between neurons.

9. The neuromorphic system of claim 1, further comprising a multi-core neuron network having connected cores for generating neuron activity and synapse activity between neurons.

10. The neuromorphic system of claim 1, wherein the memory unit is a random access memory unit and the system further comprises a row and address decoder, for decoding row and column addresses for synapse weights stored in the random access memory unit.

11. A neuromorphic system for generating neuron activity, comprising, in a hardware implementation:
a neuron and synapse network that generates neuron activity and synapse activity between neurons;
an axon spike timer that measures the elapsed time between occurrences of axon spikes in synapses between neurons;
a dendrite spike timer that measures the elapsed time between occurrences of dendrite spikes in synapses between neurons;
a synapse weight memory unit that stores the current values of synapse weight;
a neuron membrane potential register that stores the current neuron membrane potential values of neurons;
a neuron membrane potential updating logic that updates the neuron membrane potential values and sends neuron fire signals to a dendrite output register, the updating based on a leaky integrate and fire model of neuron membrane potential behavior; and
the dendrite output register that converts serial neuron fire data received from the neuron membrane potential updating logic to parallel neuron fire data.

12. The neuromorphic system of claim 11, further comprising:
a synapse weight updating logic that updates synapse weight values of the synapses based on the spike time-dependent plasticity rule that considers data comprising the elapsed time between occurrences of axon spikes received from the axon timer, the elapsed time between occurrences of axon spikes received from the dendrite timer, current synapse weight values received from the synapse weight memory unit.

13. The neuromorphic system of claim 11, wherein the neuron membrane potential updating logic is configured to generate neuron fire signals when neuron membrane potential values attain a neuron fire threshold value and for resetting and presetting neuron potential values on neuron firing.

14. The neuromorphic system of claim 11, wherein the neuron and synapse network is a single core network without a feedback connection for generating neuron activity and synapse activity between neurons.

15. The neuromorphic system of claim 11, wherein the neuron and synapse network is a single core network with a feedback connection for generating neuron activity and synapse activity between neurons.

16. The neuromorphic system of claim 11, wherein the neuron and synapse network is a multi-core network having connected cores for generating neuron activity and synapse activity between neurons.

17. A method for simulating neuron activity with spike time-dependent plasticity modeling and leaky integrate and fire modeling comprising, implementing in hardware:
generating neuron activity and synapse activity between the axons of pre-neurons and neuron bodies of post-neurons in a wired network;
timing the elapsed time between occurrences of axon spikes in synapses between neurons in a timer unit;
timing the elapsed time between occurrences of dendrite spikes in synapses between neurons in a timer unit;
storing current neuron membrane potentials of neurons in a storage block;
updating neuron membrane potential values in a logic block that performs the update based on leaky integrate and fire model of neuron membrane potential decay; and
updating synapse weight values of the synapses in a logic block that performs the update determination based on spike time-dependent plasticity rule.

18. The method according to claim 17, wherein the updating of neuron membrane potential values based on the leaky integrate and fire model of neuron membrane potential decay is determined based on the elapsed time between the axon spikes, the stored current synapse weight values of the synapses, and the current neuron membrane potential of the neurons; and
the updating of synapse weight values of the synapses based on the spike time-dependent plasticity rule is determined based on the elapsed time between axon spikes, the elapsed time between dendrite spikes, and the stored current synapse weight values.

19. The method according to claim 17, further comprising:
converting serial neuron fire data to parallel neuron fire data.

* * * * *